United States Patent [19]

Manulik

[11] Patent Number: 5,353,874
[45] Date of Patent: Oct. 11, 1994

[54] HORIZONTAL WELLBORE STIMULATION TECHNIQUE

[76] Inventor: Matthew C. Manulik, 1902 N. "I", Midland, Tex. 79705

[21] Appl. No.: 20,641

[22] Filed: Feb. 22, 1993

[51] Int. Cl.⁵ ............................................. E21B 43/25
[52] U.S. Cl. ..................................... 166/281; 166/50; 166/282
[58] Field of Search ................ 166/50, 268, 281, 282, 166/292, 305.1

[56] References Cited

U.S. PATENT DOCUMENTS

| | | |
|---|---|---|
| 2,124,495 | 7/1938 | Miller et al. |
| 2,146,754 | 2/1939 | Maness |
| 2,198,563 | 4/1940 | Robinson, Jr. |
| 2,214,366 | 9/1940 | Freeland et al. |
| 2,599,745 | 6/1949 | Campbell et al. |
| 2,739,940 | 3/1956 | Barrett |
| 2,772,739 | 12/1956 | Brakel |
| 2,793,995 | 5/1957 | Twining |
| 3,190,355 | 6/1965 | Clement |
| 3,353,600 | 11/1967 | Annis et al. |
| 3,375,888 | 4/1968 | Lummus et al. ............... 175/72 X |
| 3,593,798 | 7/1971 | Darley .............................. 166/295 |
| 3,814,187 | 6/1974 | Holman .......................... 166/281 |
| 3,830,299 | 8/1974 | Thomeer ...................... 166/281 X |
| 4,222,444 | 9/1980 | Hamilton ........................... 175/72 |
| 4,422,948 | 12/1983 | Corley et al. ................... 175/72 X |
| 4,722,397 | 2/1988 | Sydansk et al. ................ 166/50 X |
| 4,938,286 | 7/1990 | Jennings, Jr. .................. 166/297 X |
| 4,951,751 | 8/1990 | Jennings, Jr. .................... 166/50 X |
| 5,074,360 | 12/1991 | Guinn ............................. 166/50 X |
| 5,222,558 | 6/1993 | Montgomery et al. ......... 166/281 X |

*Primary Examiner*—George A. Suchfield

[57] ABSTRACT

A method of treating a downhole formation in a wellbore having multiple zones of porosity by circulating a carrier fluid downhole to the lowermost zone of porosity, and then flowing an acid soluble blocking agent into the wellbore. The blocking agent is translocated to a location where it is free to flow along the lower end of the borehole and seal the zones of porosity. The blocking agent is a mixture of acid soluble material that is relatively insoluble in the carrier fluid, and is of a size to block the pores of the zones of porosity so that flow into the zones is severely reduced. A solution of acid is spotted downhole within a selected zone of porosity. The solution of acid degrades the blocking agent and the degraded blocking agent becomes admixed with the carrier fluid and the flow restriction of the blocking agent within the zone is destroyed. Next a treatment fluid for stimulating the selected zone is conveyed downhole and forced into the opened selected zone until the zone is stimulated. The residual blocking agent is removed from the borehole by circulating a solution of acid downhole and into contact with the acid soluble material that is blocking the untreated pores of the zones of porosity and opens all of the zones to the borehole.

7 Claims, 6 Drawing Sheets

HORIZONTAL WELLBORE STIMULATION TECHNIQUE

BACKGROUND OF THE INVENTION

1. Field of Invention

This invention relates to a well completion process and more particularly to a well completion process in a wellbore which has an extended length exposed to a subterranean hydrocarbon bearing formation.

Historically, wellbores were drilled vertically, exposing the vertical cross-sectional height of the hydrocarbon bearing formation to the wellbore. Horizontal wells, which are currently being drilled, are drilled nearly perpendicular to the vertical axis of the formation to contact a greater amount of the formation. The horizontal portion of the wellbore is herein referred to as the lateral wellbore.

Horizontal and deviated wellbores are drilled laterally, penetrating thousands of feet of a hydrocarbon bearing formation. These bores intersect numerous porous and permeable hydrocarbon bearing zones. These intersected zones vary in permeability from secondary porosities such as open fractures and vugs which have darcies of permeability, to matrix porosities and closed fractures which have millidarcies of permeability. Hydrocarbon bearing zones which intersect the borehole vary in distribution and length within the wellbore. Some wells exhibit a number of small zones (less than 50 feet) randomly distributed in the wellbore, while other wells have hydrocarbon shows throughout the entire length of the lateral bore, which sometime exceed 5,000" in length.

The prior art indicates that the Oil and Gas Industry has attempted many forms of conventional vertical stimulation techniques in these extended horizontal wellbores. Ideally these hydrocarbon bearing zones are isolated and treated individually for the best result. A major obstacle and concern in the stimulation and treatment of horizontal bores has been the management, placement and distribution of treatment fluids into the numerous hydrocarbon bearing and non-hydrocarbon bearing zones exposed in the wellbore. Inability to isolate a segment of the exposed lateral renders many forms of conventional Oil and Gas stimulations ineffective because the necessary hydraulic horsepower cannot be delivered to the desired portion of the formation due to fluid losses in the remainder of the exposed wellbore. Other conventional stimulations which are not injection rate dependent are also rendered ineffective by the inability to create a path of least resistance into a desired interval or segment of the exposed lateral.

Mechanical isolation using casing, external casing packers, cement, and perforations have been mechanically difficult and cost prohibitive. Attempts to distribute treatment fluids into the numerous pay zones using fluid entrained diverting agents such as polymers, wax beads, rock salt, and the like have met with limited success. Dendritic or water fracs appear to be successful in some areas, but have also experienced failure in other areas.

The present invention provides a solution to the above problems by isolating and diverting treatment fluid in horizontal wellbores in a new and novel manner.

DESCRIPTION OF RELATED ART

In prior art there are many examples of the use of acid soluble materials and the inherent benefits thereof in the drilling and completion of oil and gas wells. For example, Robinson U.S. Pat. No. 2,198,563 cites the use of crushed calcium carbonate as a mud additive to aid in the subsequent acid removal of the mud's filter cake from a producing formation. Barrett U.S. Pat. No. 2,739,940 describes the user of acid soluble fibrous rock wool or mineral fiber and mica and the subsequent removal of this mud's filter cake using acid. Twining U.S. Pat. No. 2,793,995 cited the same removal benefits using nylon, rayon, and silk fibers as the acid soluble component of drilling mud. Corley and Dorsey U.S. Pat. No. 4,422,948 cited the use of combined fiber, flake, and granular acid soluble mud additives to prevent lost circulation in a hydrocarbon bearing zone and the capability to restore formation permeability through the acid solubility of the lost circulation mud additives.

Many others have cited the effectiveness of combinations of fibers, flakes, and particles in sealing permeable formations encountered while drilling. Lummus and Randall U.S. Pat. No. 3,375,888 establishes prior art which deals with the effectiveness of sealing permeable formations with various compositions of fiber, flakes, and granules. Many others have addressed these arts.

This invention differs from the prior art primarily because the invention is not devoted to the sealing effectiveness or the protection of sealing permeable hydrocarbon bearing zones. Instead, this invention concerns the discrete stimulation and treatment of multiple hydrocarbon bearing zones exposed in a single wellbore. The present invention further comprehends the prevention and restriction of stimulation or treatment fluid entry into unwanted permeable zones exposed to the wellbore. The term "discrete" herein pertains to the creation of a path of least resistance into a selected zone or zones for the placement of treatment fluids and thereby restricting the flow of fluids into the remaining zones not selected which are exposed in the wellbore.

SUMMARY OF THE INVENTION

The present invention relates to the use of a chemically removable blocking agent, such as flexible fiber, flakes, and rigid granular particles, for injection into a wellbore communicated with a subterranean formation to seal permeable formations. The blocking agents used in this invention are relatively insoluble in both water and hydrocarbons, and are solubilized in the presence of acid. A carrier fluid is pumped or flowed into the wellbore and a mixture of acid soluble material, or blocking agent, is mixed with a transporting liquid or carrier fluid, to form a continuous stream, or as a high concentration "slug" or "pill", and injected into the wellbore as a slurry. The blocking agent is relatively insoluble in the transporting liquid. The initial purpose of the slurry is to seal or severely restrict the flow of fluids into all permeable formations exposed to the wellbore. Upon stopping or reducing fluid losses into the formation, a solution of acid is "spotted" or placed through a suitable conduit in a segment or window of the wellbore at a location which the operator desires to treat or stimulate. Upon placement of this acid, the components of the blocking material dissolve and the selected segment's permeability is restored. Accordingly the unblocked segment of the wellbore can be stimulated or treated in any of several manners known to those skilled in the art, while the remainder of the wellbore remains blocked. Upon completion of stimulation or treatment of the segment, it is once again sealed or plugged using the fluid entrained acid soluble blocking materials initially used to seal the wellbore. The process of opening another segment of the wellbore is repeated and again treated or stimulated. This process is repeated until all desired segments have been treated or stimulated. When desired, after the completion process is complete, the wellbore can be circulated with acid and the blocking material dissolved and removed from the wellbore in a liquid form.

A primary object of the present invention is the provision of a method of stimulating one of a plurality of zones of porosity of a production formation in a wellbore. The invention enables the sequential treatment of a plurality of individual zones, through the aforementioned ability to discretely treat one zone at a time.

Another object of the invention is to limit or eliminate the loss of stimulation fluids into non-productive porosity zones of a formation exposed to the wellbore during the stimulation process.

A further object of this invention is to disclose and provide a more economical process with which extended wellbores can be stimulated.

A further object of this invention is to disclose and provide a method of effectively treating a selected plurality of zones simultaneously while reducing or eliminating fluid losses to non-productive zones of porosity exposed to the wellbore.

A further object of this invention is to disclose and provide a cost effective process with which a selected plurality of zones can be stimulated simultaneously in a wellbore which is exposed to a plurality of porous zones.

A further object of this invention is to disclose and provide a method of selectively opening a segment of a wellbore that enables the more efficient delivery of hydraulic horsepower, by restricting fluid losses to the remainder of the bore, and therefore more effectively treat the aforementioned segment of the wellbore.

These and various other objects and advantages of the invention will become readily apparent to those skilled in the art upon reading the following detailed description and claims and by referring to the accompanying drawings.

The above objects are attained in accordance with the present invention by the provision of a method for stimulating one of a plurality of zones of porosity of a production formation of a wellbore in a manner substantially as described herein.

DETAILED DESCRIPTION OF THE PREFERRED EMBODIMENT

The blocking agent or fiber component of this invention must be acid-soluble deformable-like material. Fibrous materials which are commonly available for this blocking agent are rock wool, also known as mineral fiber, and nylon and rayon industrial waste which have been processed for use in pumping equipment. The preferable blocking agent is the mineral fiber. A typical composition by weight of the desired mineral fiber is $CaO$-36%, $MgO$-9%, $Al2O3$-9%, and $SiO2$-42%. The composition can be varied in the spin extrusion manufacturing process, but for the purposes of this invention any composition that is relatively insoluble in the transporting fluid, and which remains acid soluble can advantageously be used. Laboratory tests have shown manufactured samples of some mineral fibers to be 99.85% soluble in 7.5% hydrochloric acid (HCL).

When using flakes in addition to fiber, the flake component of this invention should be flexible and acid soluble. A flake material that is suitable for the process of this invention is flaked aluminum. Aluminum exhibits the flexibility necessary for sealing and is very acid soluble in HCL acid. Once the aluminum has been dissolved, the pH of the carrying fluid must be controlled to prevent reprecipitation of aluminum salts.

The granular component of this invention incorporates many of the alkaline earth carbonates. The material of choice is granulated or flaked calcium carbonate which undergoes a rapid solubilizing reaction when contacted with HCL acid.

Figure 1:
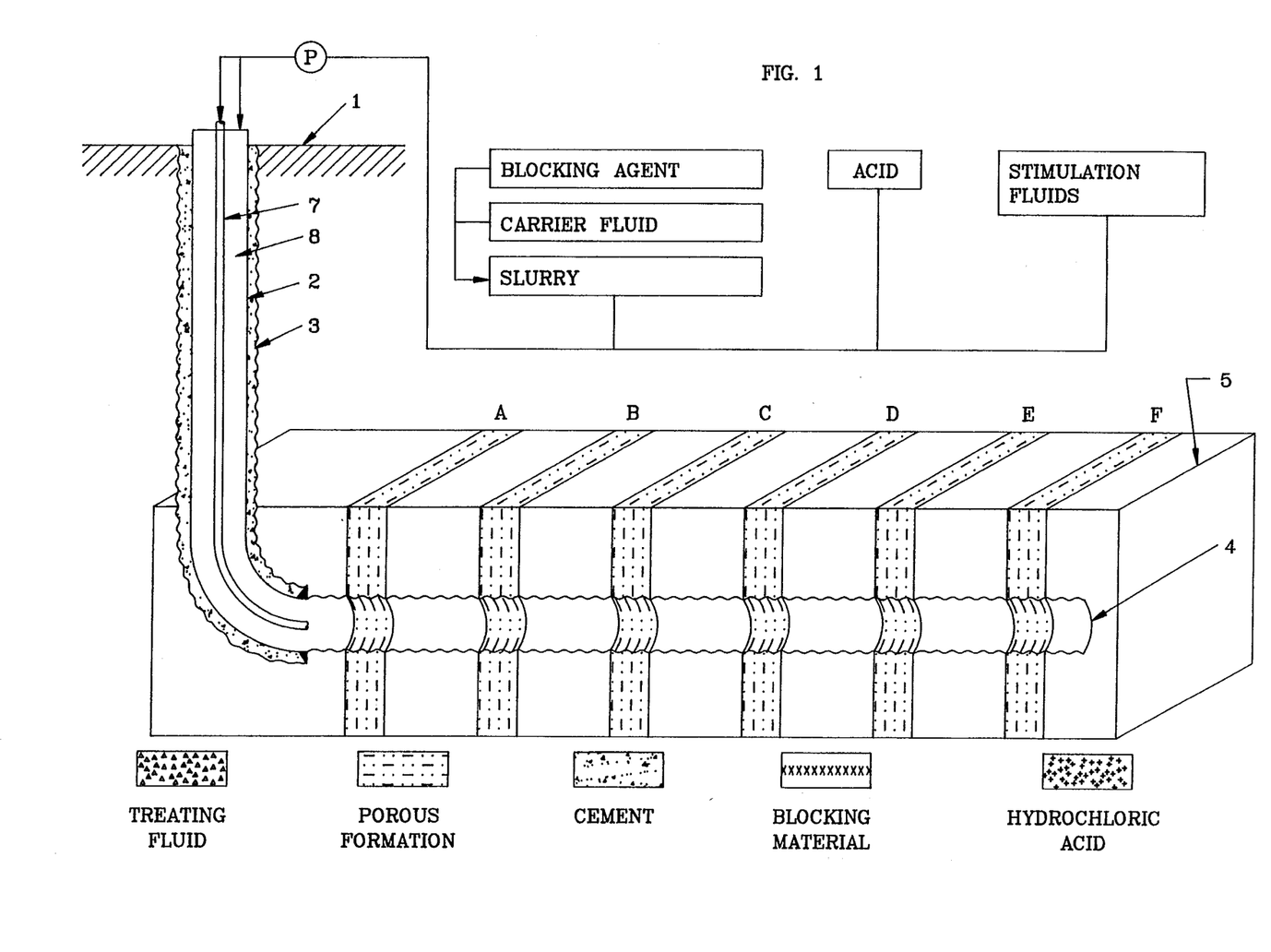
FIG. 1 is a part schematical, part diagrammatical cross-sectional representation of a wellbore formed into the ground; and, FIGS. 2-6 diagrammatically illustrate various sequential steps of the present invention carried out in conjunction with FIG. 1. The wellbore representation is for illustrative purposes and is in no way intended to limit the use of the teachings contained herein to a specific wellbore orientation or any specific formation distribution, formation orientation, or formation characteristic.

This invention provides a method of improving the control of the placement of treating fluids in boreholes in a cost effective manner. Three hypothetical examples of the steps taken to achieve this goal are as follows. In each example it will be assumed that evaluation of prior drilling and completion data and information is performed by those skilled in the art to delineate the portions or segments of the wellbore it is desired to stimulate and treat. For the purposes of the following examples a horizontal wellbore is depicted in FIG. 1. The wellbore has been formed through the surface 1 of the ground. A casing string 2 has been cemented into place as indicated by numeral 3. The lower end of the borehole extends horizontally and terminates at numeral 4. The horizontal portion of the wellbore described in the preceding sentence is also referred to as the "lateral". For descriptive purposes the "lowermost" point of the wellbore is the end of the bore furthest from the surface location as depicted in FIG. 1 by numeral 4. The wellbore has been evaluated and the zones labeled "A", "C", and "E" have been found to be hydrocarbon bearing. Also the evaluation has determined that zones "B", "D", and "F" are water bearing.

EXAMPLE #1

Figure 3:
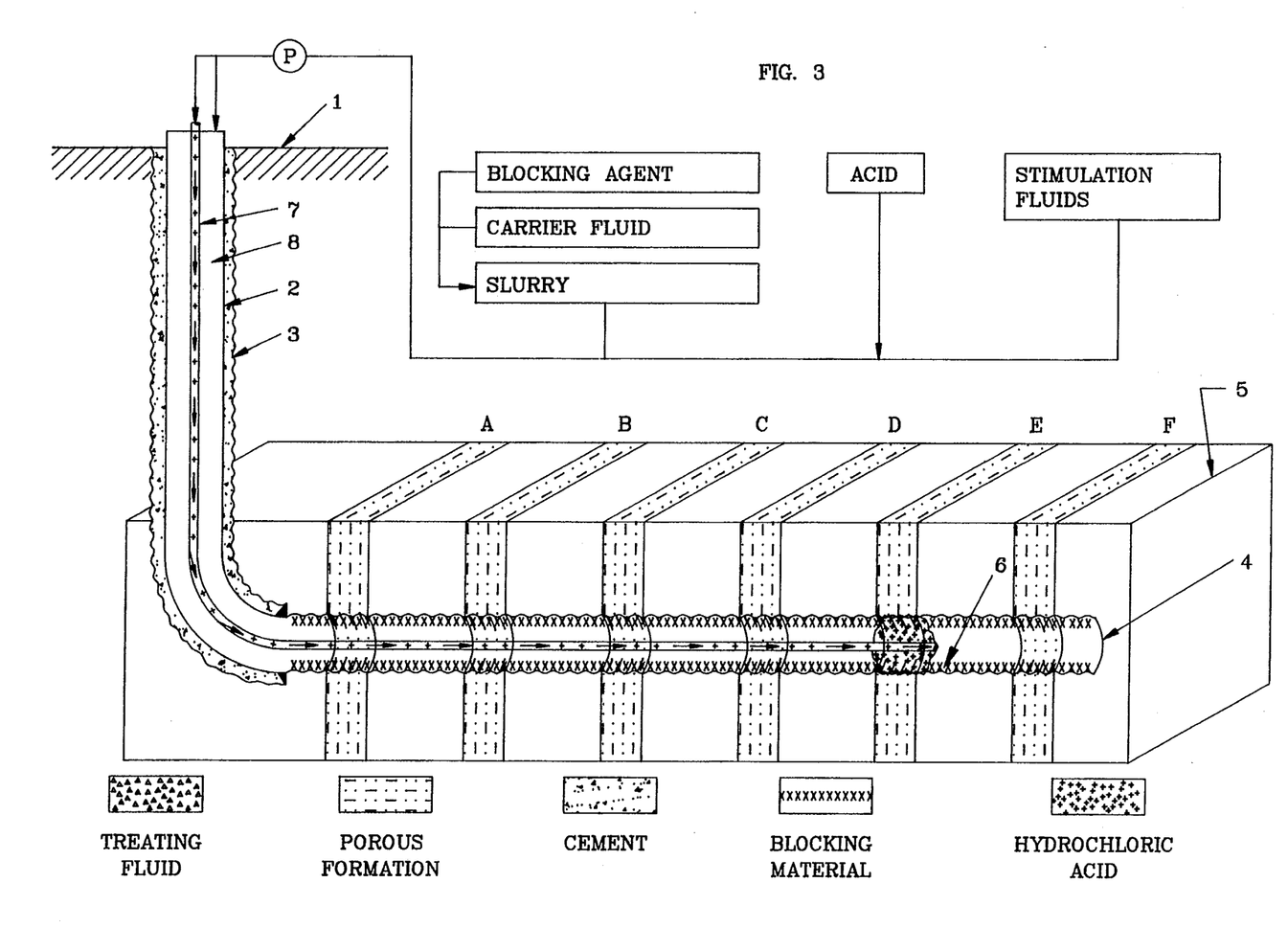
Figure 4:
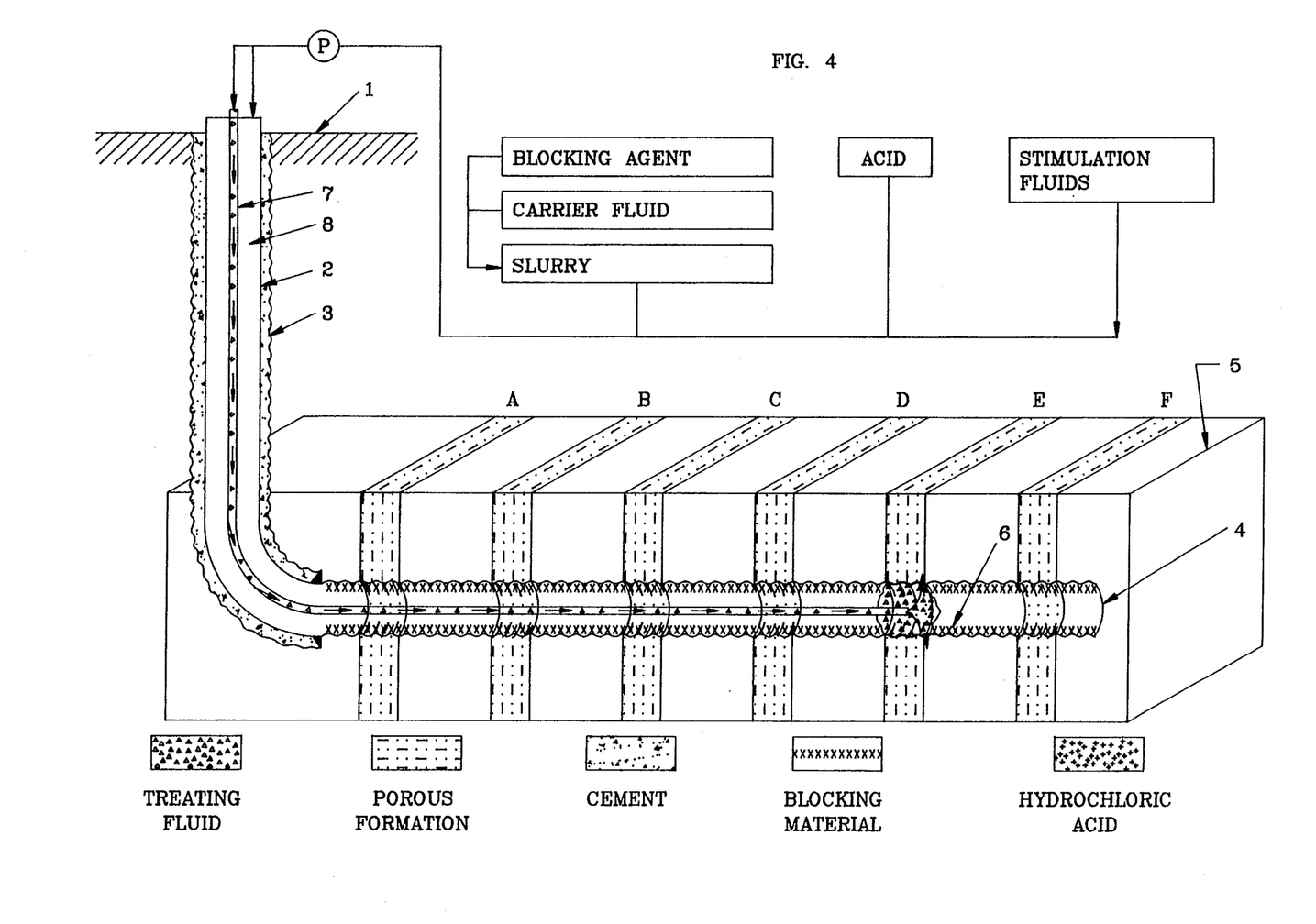

A blocking agent is admixed with a water to form a slurry. The blocking agent is a fibrous acid soluble material which is depicted by numeral 6 in FIG. 2. The slurry is pumped downhole. The material is allowed to differentially block the formation. Then the formation is pressured to determine the amount of fluid leak off of the fibrous seal. If fluid leak off is too great to achieve the desired rate of fluid injection in the selected target zone, additional acid soluble blocking components of fiber, granular, and flake material are injected into the wellbore until the fluid losses through the blocking material are reduced to an acceptable value. At this point the segment of the wellbore which is targeted for treatment, zone "E", is opened by placing acid in the wellbore adjacent to this zone by pumping acid through a suitable conduit 7, as shown in FIG. 3. The terminal end of the conduit 7 is placed adjacent to zone "E". The size of the opening in the selected zone can be controlled through manipulation of the conduit, as depicted in FIG. 3, and acid volumes. Once the blocking material of the selected zone is solubilized, injection into the opened zone "E" can be achieved both by pumping through a conduit 7 and the annular area 8 between the conduit and casing. The rate through the annular area will be approximated by the rate established by the previous fluid leak off injection test of the entire wellbore prior to break down of the target zone. In most cases the treatment will be conducted through a conduit 7 to protect the remaining blocking material from acids used in the treatments as shown in FIG. 4. Some stimulations which do not incorporate the use of acid as a component of the treatment can be achieved at this this by injection through the conduit 7, annulus 8, or both, if desired. Upon the completion of the stimulation of zone "E", blocking material is once again pumped into the wellbore to block the treated zone "E". Zones "A" and "C" can now be sequentially treated using the same above method previously used to treat zone "E". This process of segmenting the borehole can be repeated as many times as necessary to sequentially treat all the desired zones of a wellbore, regardless of the number of zones. The type of stimulation may be varied to enhance treatment of different segments of the wellbore, if desired. Upon completion of stimulation of the last segment of the wellbore, the entire wellbore can be circulated with a weak solution of HCL acid whereupon all of the blocking material is solubilized and removed by circulation of the borehole.

EXAMPLE #2

Figure 2:
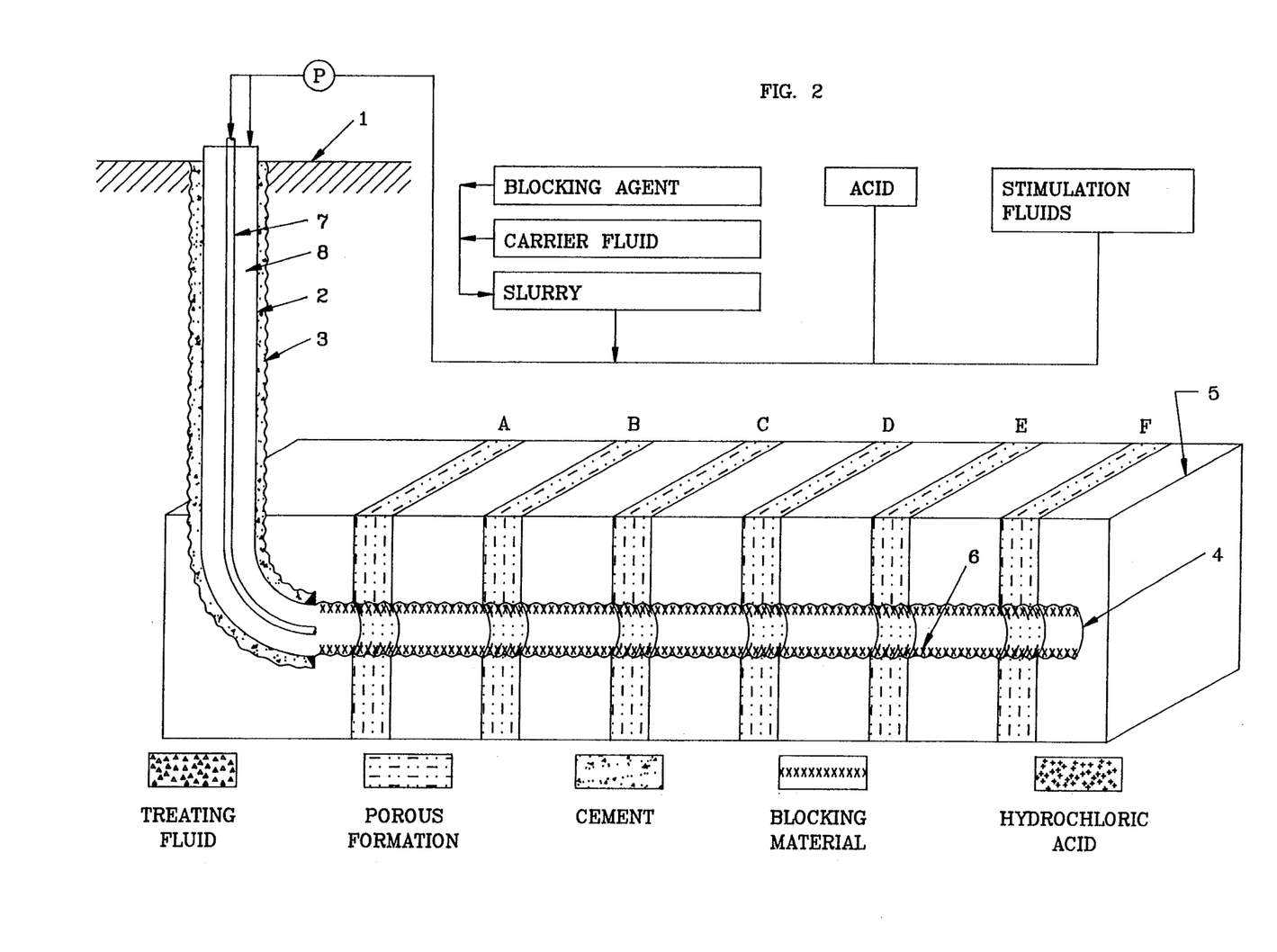
Figure 5:
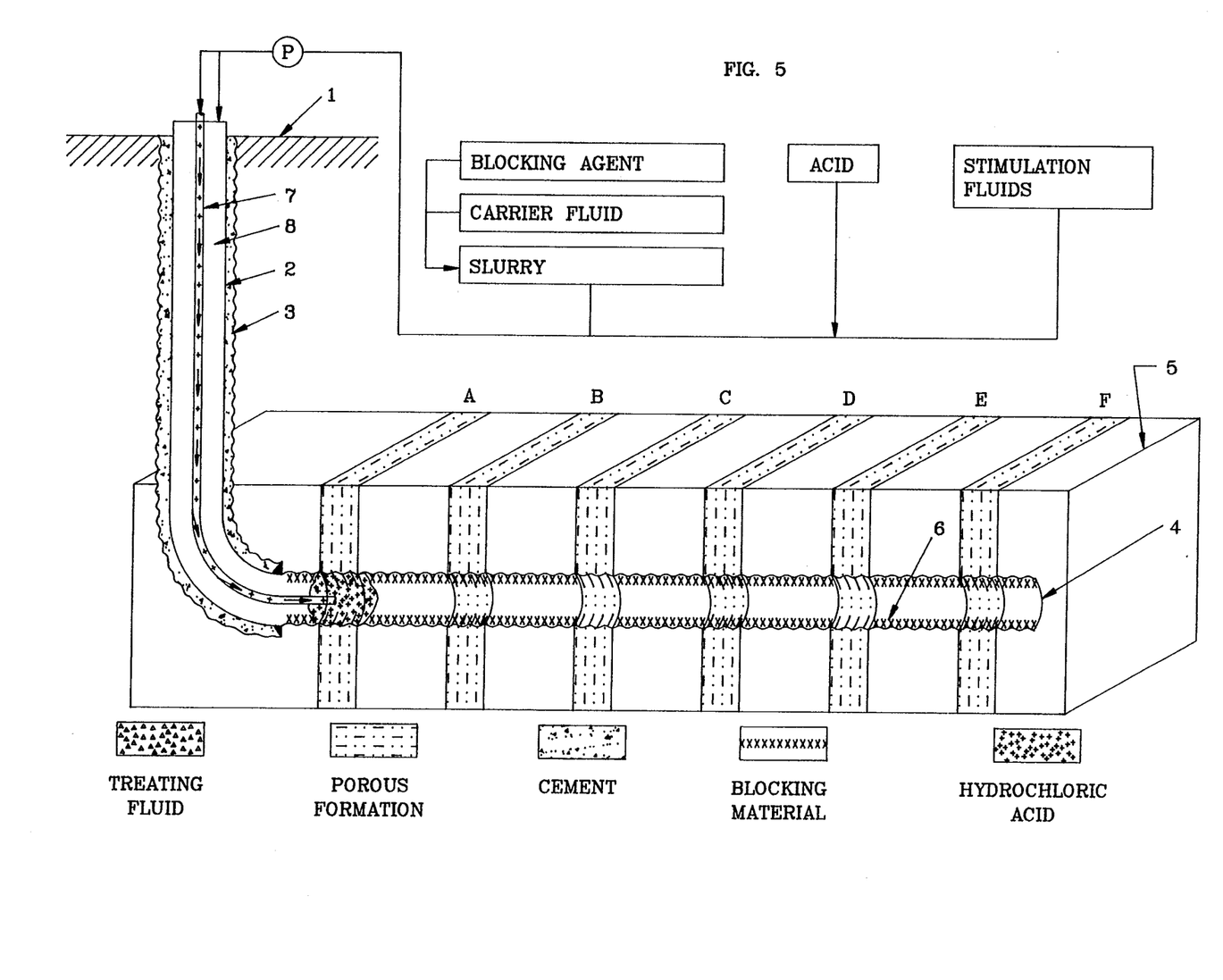
Figure 6:
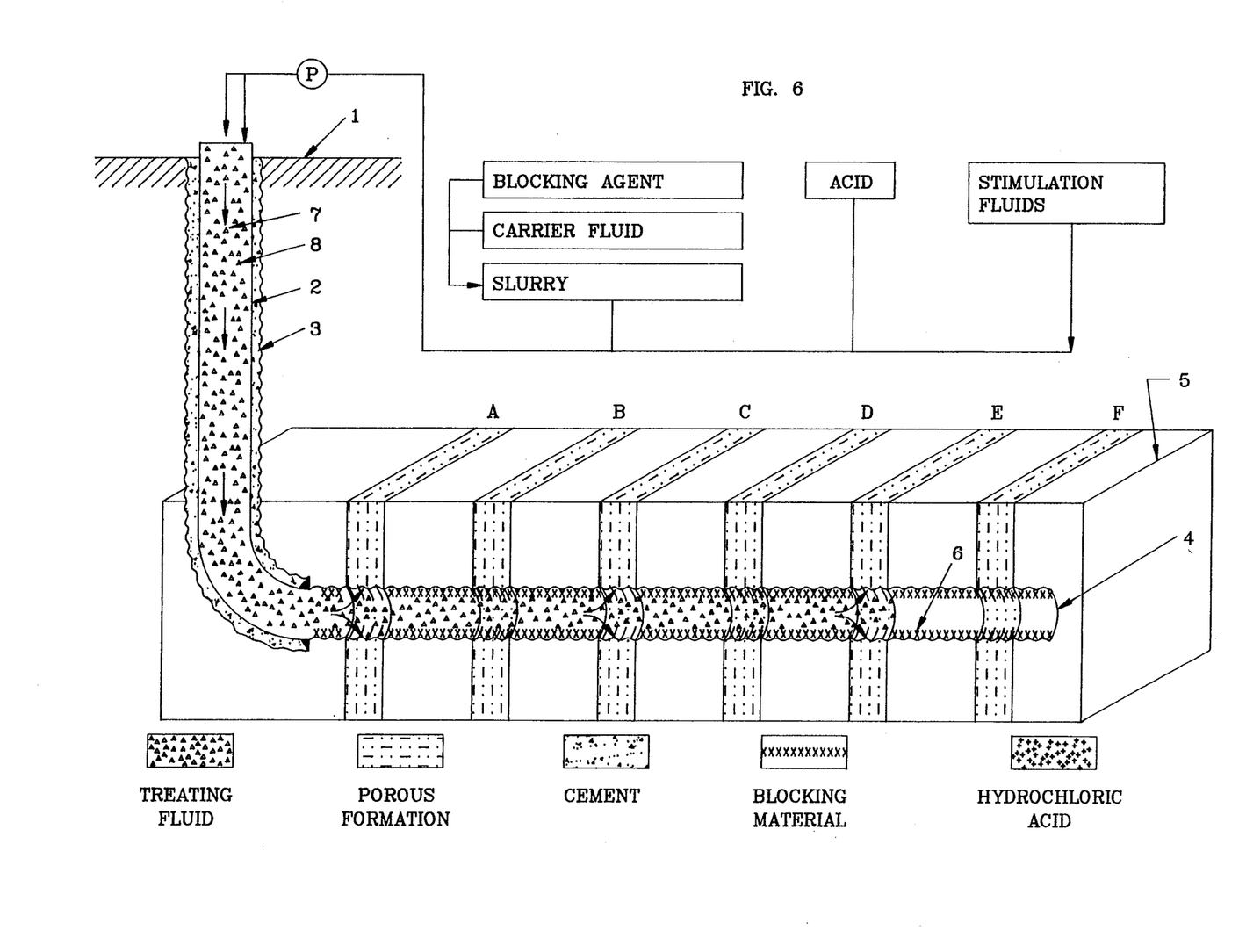

Another method of treatment would be to place the blocking material 6 throughout the entire wellbore as illustrated in FIG. 2. The placement of acid is achieved using conduit 7 to open multiple windows by sequentially solubilizing the blocking material 6 in zones "A", "C", and "E" of the wellbore as shown in FIG. 5. The multiple zones can now be treated simultaneously, as shown in FIG. 6, using any number of conventional treatments which do not incorporate a low pH solution. Once the treatment is complete, the wellbore can be circulated with a weak acid to remove the remaining blocking material.

EXAMPLE #3

Another method would be to use the above segmenting process to treat zone "E" of example #1 and not re-block the already treated zone "E". The pressure artificially induced in the treatment of zone "E" is used to differentially create a path of least resistance into zone "C" when zone "C" is opened using the segmenting process. Subsequently zone "A" is differentially treated using the same procedure, once the pressures of zones "E" and "C" have been elevated by the placement of treatment fluids.

The procedures of these examples are not meant to limit the mechanical methods of opening and stimulating zones of a wellbore. Any number of operational methods can be used by those skilled in the arts.

I claim:

1. A method of treating a downhole formation in a horizontal or deviated wellbore having multiple zones of porosity comprising the steps of:
   step 1; flowing or pumping a carrier fluid downhole to the lowermost zone of porosity, thereby subjecting each of the multiple zones of porosity to the carrier fluid;
   step 2; admixing a blocking agent with said carrier fluid and thereby translocating the blocking agent to a location where the blocking agent is free to flow along the lower end of the borehole and seal the zones of porosity, wherein
   said blocking agent comprises a mixture of acid soluble material which is relatively insoluble in said carrier fluid; that is of a size to block the pores or fractures of the zones of porosity and thereby prevent or restrict flow into the zones;
   step 3; opening a selected zone of said multiple zones of porosity by spotting a solution of acid downhole within said selected zone of porosity to be opened whereby the solution of acid degrades the blocking agent and the solubilized blocking agent becomes admixed with the carrier fluid and is translocated from the borehole by the carrier fluid;
   step 4; conveying a treatment fluid to the selected zone downhole and pressuring the treatment fluid into the opened selected zone until the zone is treated.

2. The method of claim 1 wherein the zone treated is again blocked with the acid soluble material and the process of claim 1 steps 3 and 4 are repeated to discretely treat a second selected zone of the borehole.

3. The method of claim 2 wherein the second zone treated is again blocked with acid soluble material and the process of claim 2 repeated to discretely treat a third selected zone of the borehole and, a plurality of selected zones of wellbore are treated using this method.

4. The method of claim 1 and further including the steps of leaving the zone treated unblocked and repeating the process of claim 1, steps 3 through 4 to treat a second zone using the artificially elevated pressure created by treatment of the first zone to thereby differentially treat the second zone.

5. The method of claim 4 and further including the steps of sequentially differentially treating a plurality of selected zones.

6. A method of treating a downhole formation in a horizontal or deviated wellbore having multiple zones of porosity comprising the steps of:
   step 1; flowing or pumping a carrier fluid downhole to the lowermost zone of porosity, thereby subjecting each of the multiple zones of porosity to the carrier fluid;
   step 2; admixing a blocking agent with said carrier fluid and thereby translocating the blocking agent to a location where the blocking agent is free to flow along the lower end of the borehole and seal the zones of porosity, wherein
   said blocking agent comprises a mixture of acid soluble material which is relatively insoluble in said carrier fluid; that is of a size to block the pores or fractures of the zones of porosity and thereby prevent or restrict flow into the zones;
   step 3; opening a selected zone of said multiple zones of porosity by spotting a solution of acid downhole within said selected zone of porosity to be opened whereby the solution of acid degrades the blocking agent and the degraded blocking agent becomes admixed with the carrier fluid in each discrete zone of porosity;

step 4; conveying a treatment fluid to the selected zone downhole and simultaneously forcing the treatment fluid into the opened selected zones until the zones are treated.

7. The method of claim 6 and further including the step of removing the residual blocking agent from the borehole by circulating a solution of acid in the borehole and into contact with the remaining acid soluble material and thereby solubilizing and enabling the removal of said blocking material.

* * * * *